(12) United States Patent
Tsai

(10) Patent No.: US 8,241,135 B2
(45) Date of Patent: Aug. 14, 2012

(54) LATCH MECHANISM APPLIED FOR MULTI-FUNCTION GAME TABLE

(76) Inventor: Jerry Tsai, Taichung (TW)

( * ) Notice: Subject to any disclaimer, the term of this patent is extended or adjusted under 35 U.S.C. 154(b) by 234 days.

(21) Appl. No.: 12/767,971

(22) Filed: Apr. 27, 2010

(65) Prior Publication Data

US 2011/0262217 A1   Oct. 27, 2011

(51) Int. Cl.
*A63D 15/00* (2006.01)
(52) U.S. Cl. ................ 473/10; 473/14; 473/1
(58) Field of Classification Search .......... 473/10, 473/14–16, 6, 9, 19; 108/94, 1, 11, 12, 19; D21/318, 385, 397; 273/309, 108.1
See application file for complete search history.

(56) References Cited

U.S. PATENT DOCUMENTS

| | | | | |
|---|---|---|---|---|
| 1,353,728 A | * | 9/1920 | Dence | 108/62 |
| 4,305,581 A | * | 12/1981 | Neuharth | 473/15 |
| 4,365,803 A | * | 12/1982 | Barnes et al. | 473/14 |
| 4,552,362 A | * | 11/1985 | Oake | 108/6 |
| 6,155,564 A | * | 12/2000 | Tsai | 273/108.1 |
| 6,347,797 B1 | * | 2/2002 | Tsai | 473/14 |
| 8,033,923 B2 | * | 10/2011 | Chung | 473/14 |
| 2005/0049056 A1 | * | 3/2005 | Padilla | 473/10 |
| 2005/0064945 A1 | * | 3/2005 | Voden | 473/10 |

* cited by examiner

*Primary Examiner* — Mitra Aryanpour
(74) *Attorney, Agent, or Firm* — Guice Patents PLLC (57) ABSTRACT

A latch mechanism for a multi-function game table including a confinement component and a latch component. The game table has a framework and a tablet rotatably connected to the framework. The confinement component is connected to tablet of the game table. The latch component is connected to the framework of the game table and corresponds with the confinement component. A base of the latch component has a through passage corresponding with a channel of the confinement component. A switch of the latch component is located in the through passage of the base and has a manipulation member and a shut member. The manipulation member is pivotally connected to the base, and the shut member is connected to and extends outwardly from the manipulation member moving with the manipulation member. When the manipulation member pivots inside the base, the shut member is selectively inserted into the channel of the confinement component.

20 Claims, 10 Drawing Sheets

LATCH MECHANISM APPLIED FOR MULTI-FUNCTION GAME TABLE

BACKGROUND OF THE INVENTION

1. Field of the Invention

The present invention relates generally to a game table for users to enjoy playing and exercising, and more particularly to a fasten structure for securing a table after being flipped.

2. Description of the Related Art

A conventional game table usually offers only a single game mode. Because of the entertainment and relaxing benefits, the effective space and the affordable price, the game table has greatly advanced for multiple functions.

The China Patent Publication No. CN2416931Y discloses a game table that uses rotation to convert it to different modes. The game table includes a table body, an insertion hole formed on a socket embedded in one side of the end wall of the table body, and a table framework. Two ends of the table body are respectively pivotally disposed at transverse end tablets of the table framework via two pivot framework. A locating mechanism, arranged between the table framework and the table body, has four locating members respectively inserted in the insertion hole of four respective legs of the table framework. Although the locating mechanism is easy for operation, the locating member would separate from the game table somehow while removed from the table framework. Besides, the locating member is not easy to align with the insertion hole of the table body. The above mentioned disadvantages will slow down the assembly process and the orientation efficiency of the game table. In addition, the locating members are exposed after assembly to affect the whole appearance of the game table and easily to injure users.

SUMMARY OF THE INVENTION

It is therefore a primary object of the present invention to provide a latch mechanism for a multi-function game table, which can operate conveniently and lock a flipped table rapidly.

To achieve the above and other objects, a latch mechanism, applied to the multi-function game table, according to the present invention includes a confinement component and a latch component. The game table has a framework and a tablet rotatably connected to the framework so the table can be locked in place after it has been flipped. The confinement component is applied to the tablet of the game table and has a channel formed therein.

The latch component is applied to the framework of the game table to correspond with the confinement component, and the latch component includes a base and a switch. The base has a through passage corresponding with the channel of the confinement component. The switch is arranged in the through passage of the base; and has a manipulation member and a shut member. The manipulation member is pivotally connected to the base via a connecting end thereof for angular displacement, and the shut member is extends outwardly from and it connected to the manipulation member so as to move in an angular movement that is the same as the manipulation member.

When the manipulation member angularly moves within the base, the shut member rotates to reach into the channel of the confinement component. The latch component locks the confinement component so that the tablet is secured to the framework and stays still.

The present invention can be best understood through the following description and accompanying drawings.

DETAILED DESCRIPTION OF THE PREFERRED EMBODIMENTS

Figure 1:
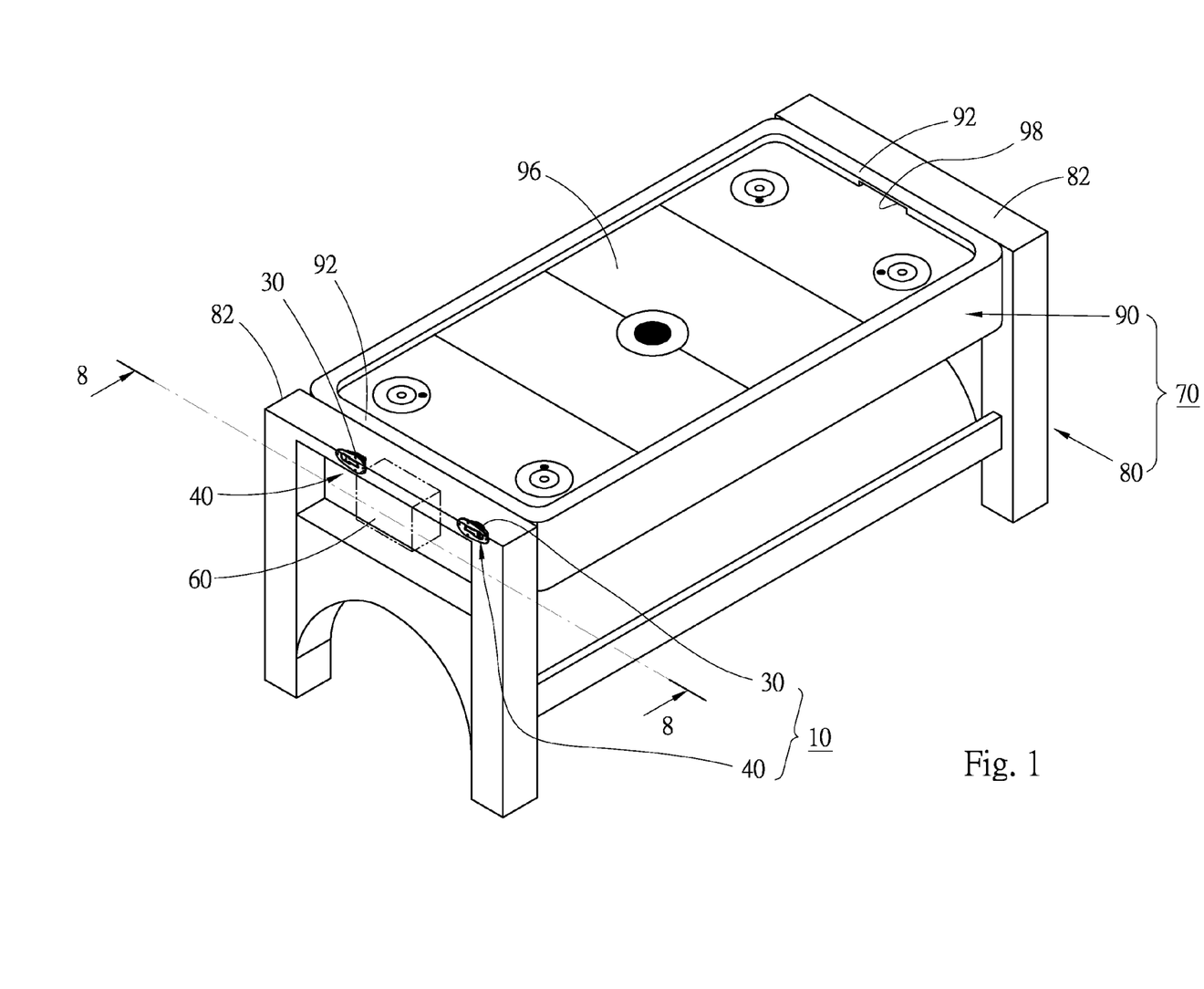
FIG. 1 is a perspective view illustrating a first implementation of a latch mechanism applied to a multi-function game table structure according to the present invention.
Figure 2:
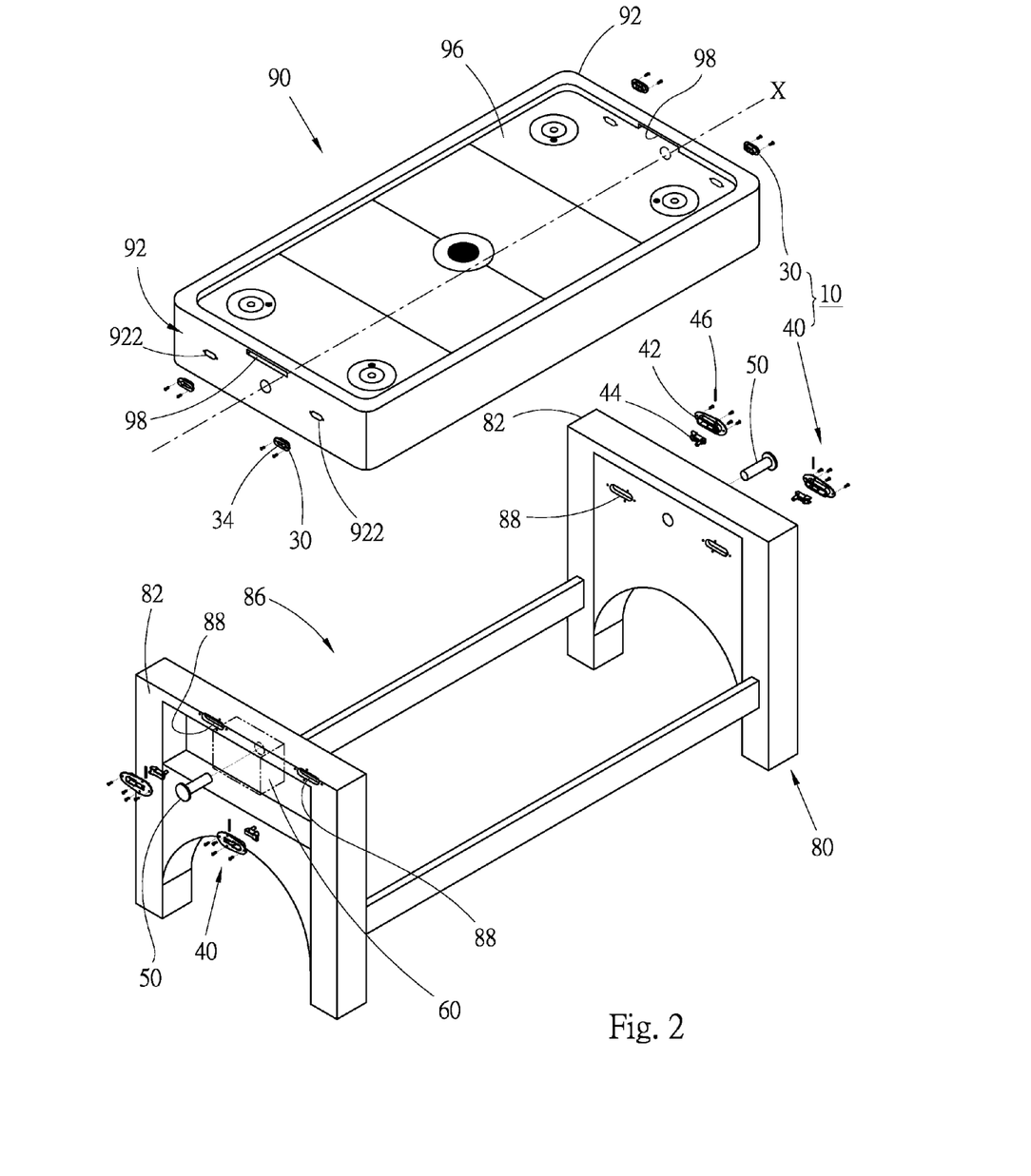
FIG. 2 is a perspective exploded view according to FIG. 1.
Figure 10:
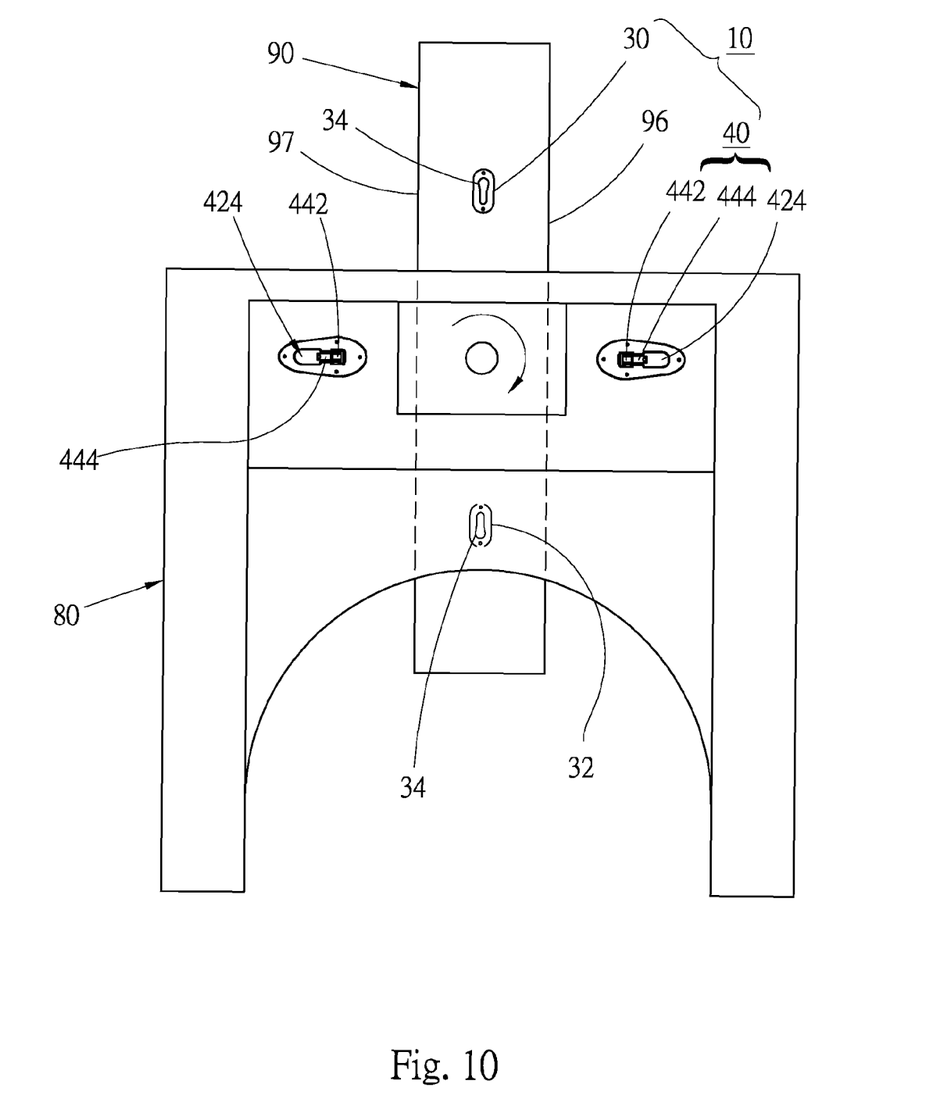
FIG. 10 is a perspective view illustrating the flip process of the table according to the first implementation of the present invention.

Please refer to FIGS. 1 and 2. According to a preferred embodiment in a first implantation, a latch mechanism 10 connected to a multi-function game table according to the present invention includes a confinement component 30 and a latch component 40. While in use, a plurality of latch mechanisms 10 are arranged on a flip-type game table 70, which includes a framework 80 and a tablet 90 rotatably connected to the framework 80 for flipping. The game table 70 is described below. The framework 80 has at least one pair of opposite sides, which are defined as two first sides 82. The framework 80 has a top section being opening through outside, and a compartment 86 being defined by the first opposite sides 82. The compartment 86 communicates with the top section so that the tablet 90 can be flipped over therein. The framework 80 further includes a plurality of predetermined holes 88 penetrating through each first side 82 to communicate with the compartment 86. The tablet 90 is approximately a rectangular body with certain thickness. The tablet 90 includes two opposite end sides 92 in a rear-and-front manner, and two game modes respectively arranged on top and bottom faces of the tablet 90. Referring FIGS. 1 and 11, the two game modes are designated as an ice hockey mode 96 and a snooker mode 97 respectively. The opposite end sides 92 of the tablet 90 are respectively pivotal along an axis X to the two first sides 82, therefore the tablet 90 is supported by the framework 80 and is rotatable in the compartment 86. In the first implementation according to the present invention, the tablet 90 rotates relative to the framework 80 via a shaft 50; one game mode, such as the ice hockey mode 96, could be turned over to face up and be horizontal. Each end side 92 of the tablet 90 is attached with a collection box 60 (shown as an imaginary line in FIGS. 1 and 2). The collection box 60 is hollow and communicates with an opening 98 of the tablet 90 in FIG. 10 (, or an opening 99 of the tablet 90 in FIG. 11), so that the ball or puck could pass through the opening 98 from the surfaces of the tablet 90 and be further collected in the connection box 60 during a game.

An exterior face at each end side 92 of the tablet 90 is formed with a plurality of recesses 922.

Referring back to FIG. 2, the confinement component 30 of the latch mechanism 10 is embedded in a respective one of the recesses 922 of the tablet 90; the latch component 40 is arranged in the framework 80 for corresponding with the confinement component 30.

Figure 3:
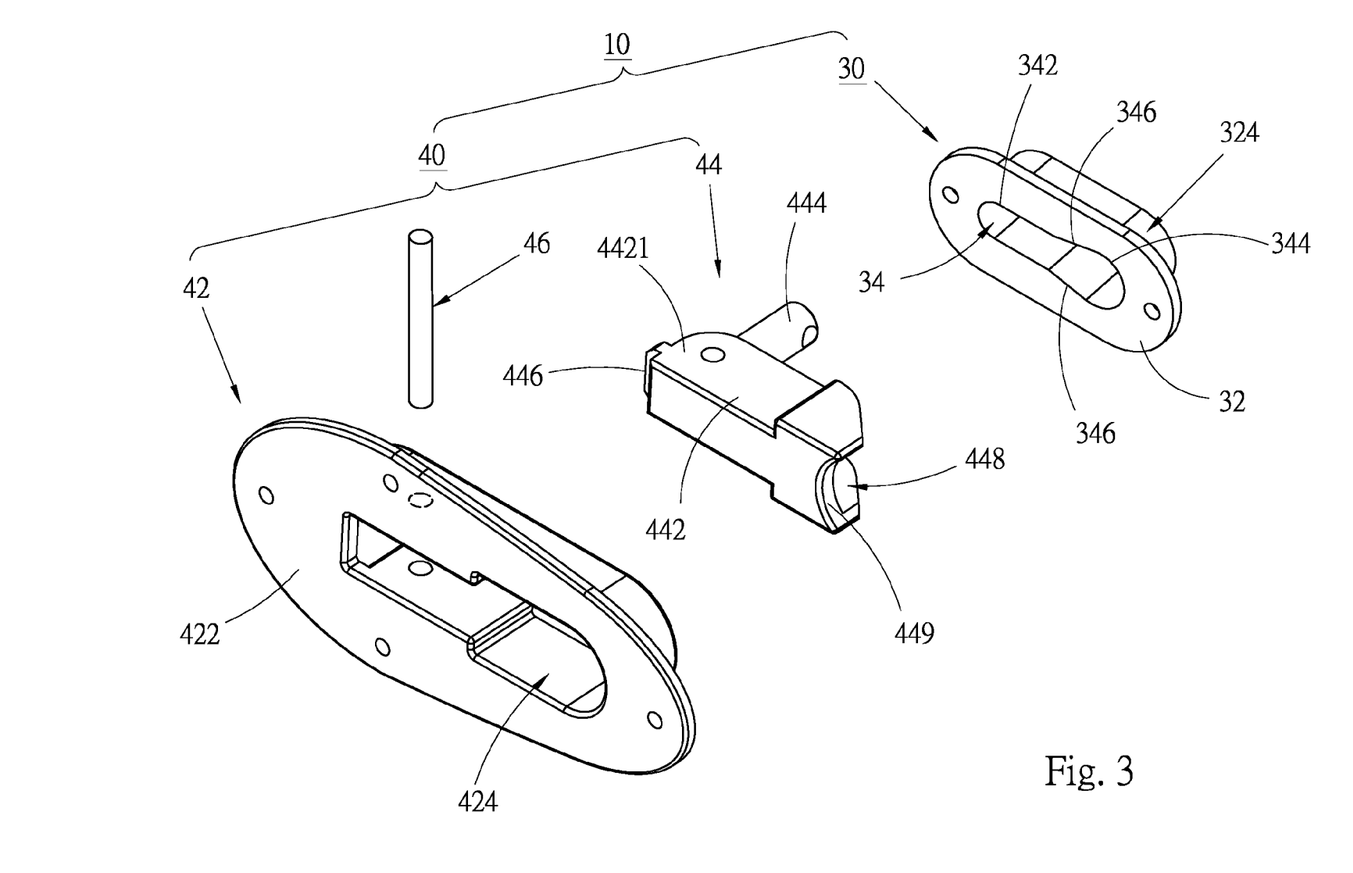
FIG. 3 a perspective exploded view of a preferred embodiment of the latch mechanism according to the present invention.

With respect to FIG. 3, the confinement component 30 includes a cover plate 32, which extends from a peripheral thereof. The cover plate 32 is formed with several screw holes for fastening to the exterior face of each end side 92 of the tablet 90 via some screws. The confinement component 30 has a channel 34 formed thereof.

Referring back to FIG. 2, the latch component 40 is secured to each first side 82 of the framework 80 in correspondence with the confinement component 30. The latch component 40 has a base 42 and a switch 44.

The base 42 is embedded within a respective one of the predetermined holes 88 of each first side 82 of the framework 80. The configuration of the base 42 is allowable to fit in a respective one of the predetermined holes 88. In this preferred embodiment, the latch component 40 has a cover plate 422 extending from a peripheral of an outer face of the base 42. The cover plate 422 touches an exterior face of each first side 82 of the framework 80 and could be secured to the framework 80 via screws. The base 42 has a through passage 424 formed from the outer face to an inter face thereof. Therefore, the through passage 424 is able to correspond with the channel 34 so as to align with the channel 34 of the confinement component 30 approximately, while the ice hockey mode 96 faces up to be horizontal.

The switch 44 is arranged in the through passage 424 of the base 42 and pivotally connected to the base 42 via a shaft 46, so that the switch 44 moves angularly in the through passage 424. The switch 44 has a manipulation member 442 and a shut member 444. The manipulation member 442 is pivotally connected to the base via a connecting end 4421 thereof by the shaft 46 for angular displacement; the shut member 444 extends outwardly from and is connected to the connecting end 4421 of the manipulation member 442 so that the angular movement of the shut member 444 is the same as the annular movement of the manipulation member 442.

As shown in FIG. 3, the channel 34 of the confinement component 30 has a first section 342, a second section 344 and a guide section 346 connecting the first section 342 and the second section 344. An internal diameter of the first section 342 is less than that of the second section 344; an internal diameter of the guide section 346 shrinks from the second section 344 to the first section 342; so that the channel 34 is wide at a first end and narrow at a second end thereof.

Figure 5:
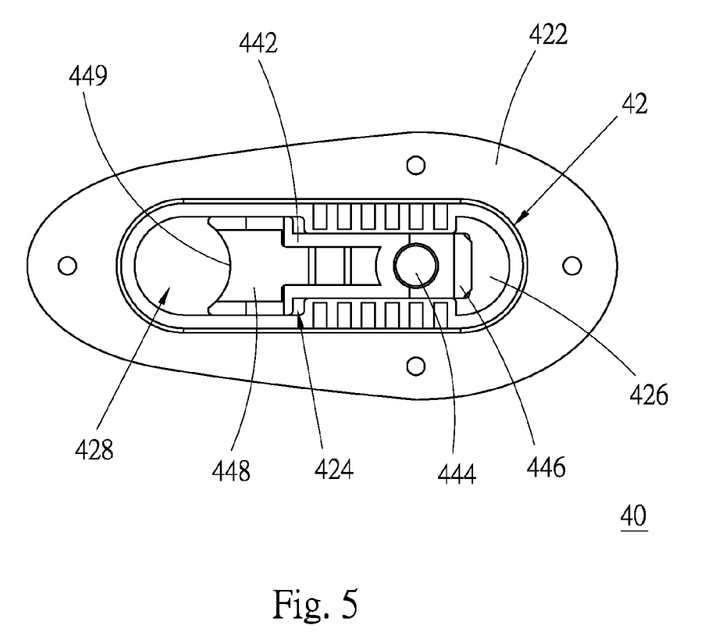
FIG. 5 is a rear view according to FIG. 4.
Figure 6:
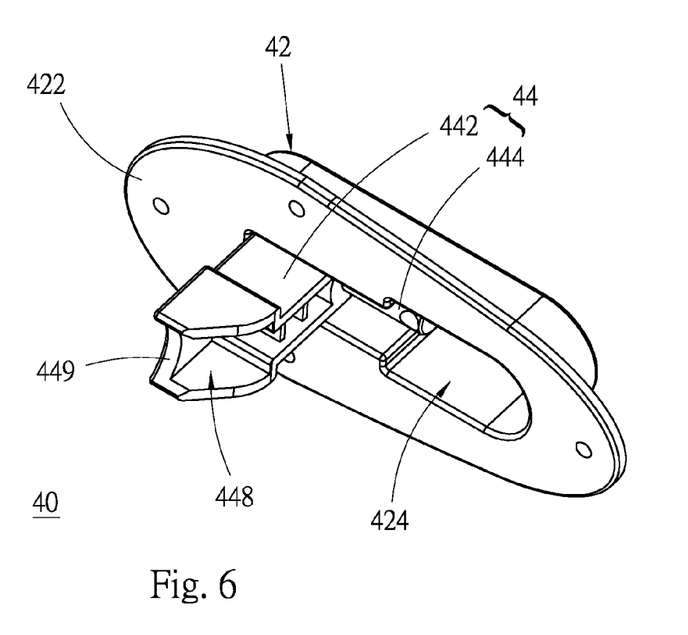
FIG. 6 is a perspective view according to the preferred embodiment of the latch mechanism, in which the latch component is in release status in a released position unlocking the tablet from the framework.
Figure 7:
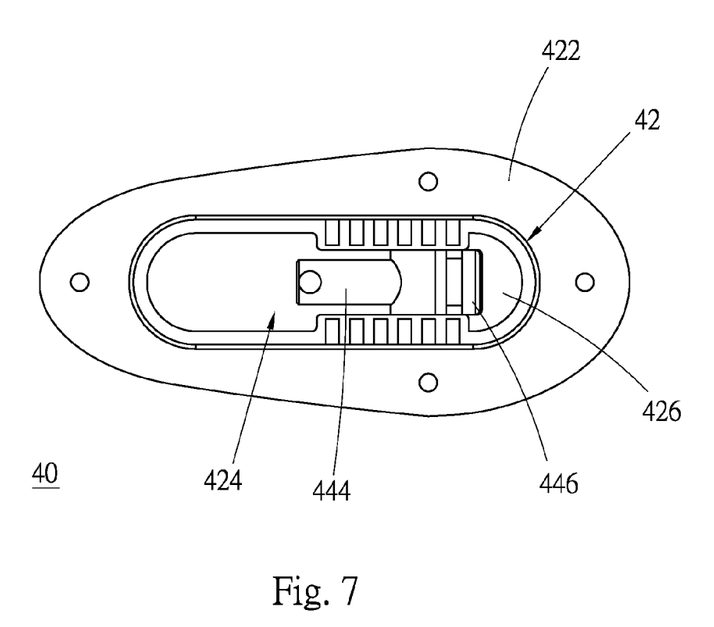
FIG. 7 is a rear view according to FIG. 6.
Figure 8:
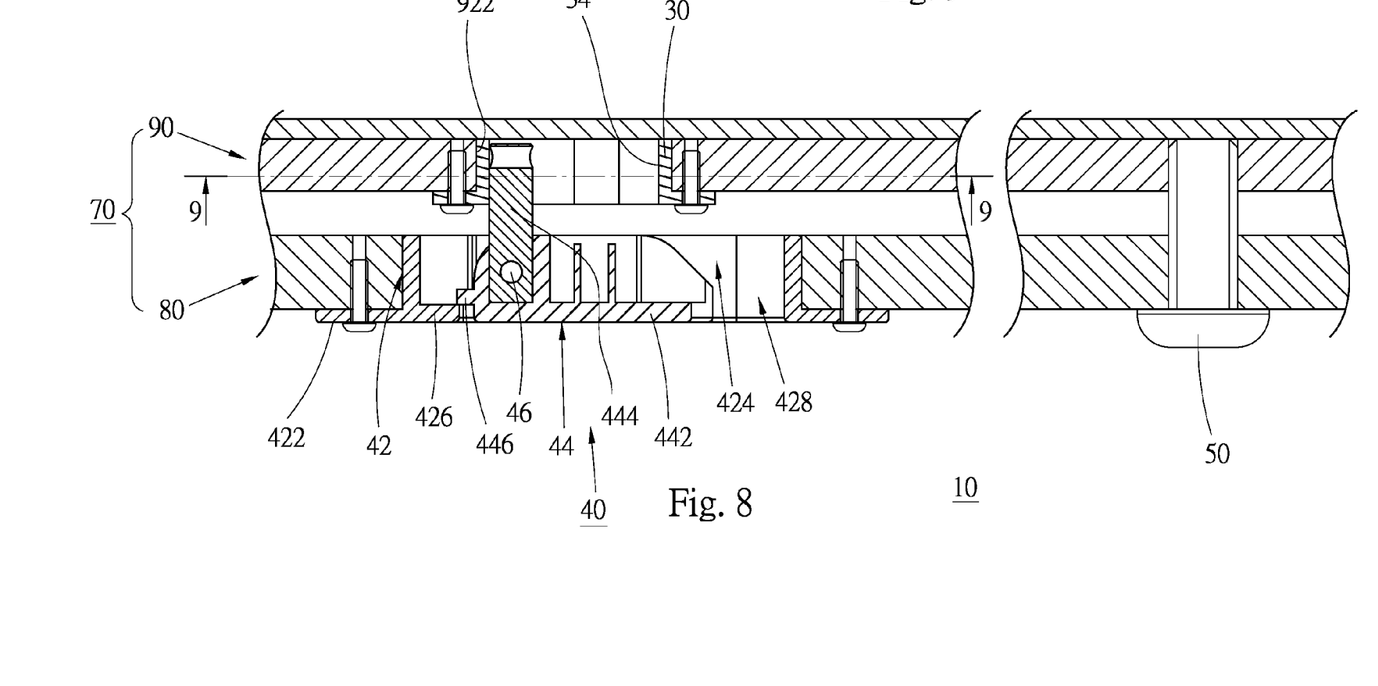
FIG. 8 is a sectional view, in which the latch component is in the latched position in order to lock the tablet to the framework, along a sectional line 8-8 according to FIG. 1.

When the manipulation member 442 of the switch 44 is pulled angularly outwards, shown in FIGS. 6 and 7, the shut member 444 moves within the through passage 424 of the base 42 and the switch 40 is in a released position. When the manipulation member 442 of the switch 44 is moved into the through passage 424 of the base 42, shown in FIGS. 4 and 5, the shut member 444 leaves the through passage 442, which is in a latched position. The shut member 444 is able to reach in the channel 34 to lock the tablet 90 while in the latched position. In use, the tablet 90 could be adjusted to stay approximately horizontal; the switch 44 is pressed inwards to be in the latched position, shown as FIGS. 3 and 8, so that the tablet 90 is locked in a fixed position.

When the shut member 444 of the switch 44 latches the channel 34 of the confinement component 34, the shut member 444 is inserted into the second section 344 of the channel 34 in the beginning. Due to the larger internal diameter of the second section 344 of the channel 34, the shut member 444 is easily inserted into the second section 344 of the channel even if the tablet 90 is not substantially horizontal, which means the channel 34 does not need to align with the switch 44 with precision.

Then, the shut member 444 moves into the guide section 346 when the switch 44 is pressed further. When the shut member 444 moves from the wide end to the narrow end in the guide section 346 of the channel 34, the tablet 90 will moves slightly into a precise horizontal position. After the guide section 346, the shut member 444 will move into the first section 342 and stop in the first section 342. The first section 342 of the channel 34 of the confinement component 30 where the shut member 444 stops and stays is defined as a stop point of the angular displacement of switch 40. The switch 44 extends into the channel 34 forming the connection between the latch component 40 and the confinement component 30. The internal diameter of the first section 342 is not less than an external diameter of the shut member 444 for fitting, the tablet 90 will stay steady thereby.

Figure 8A:
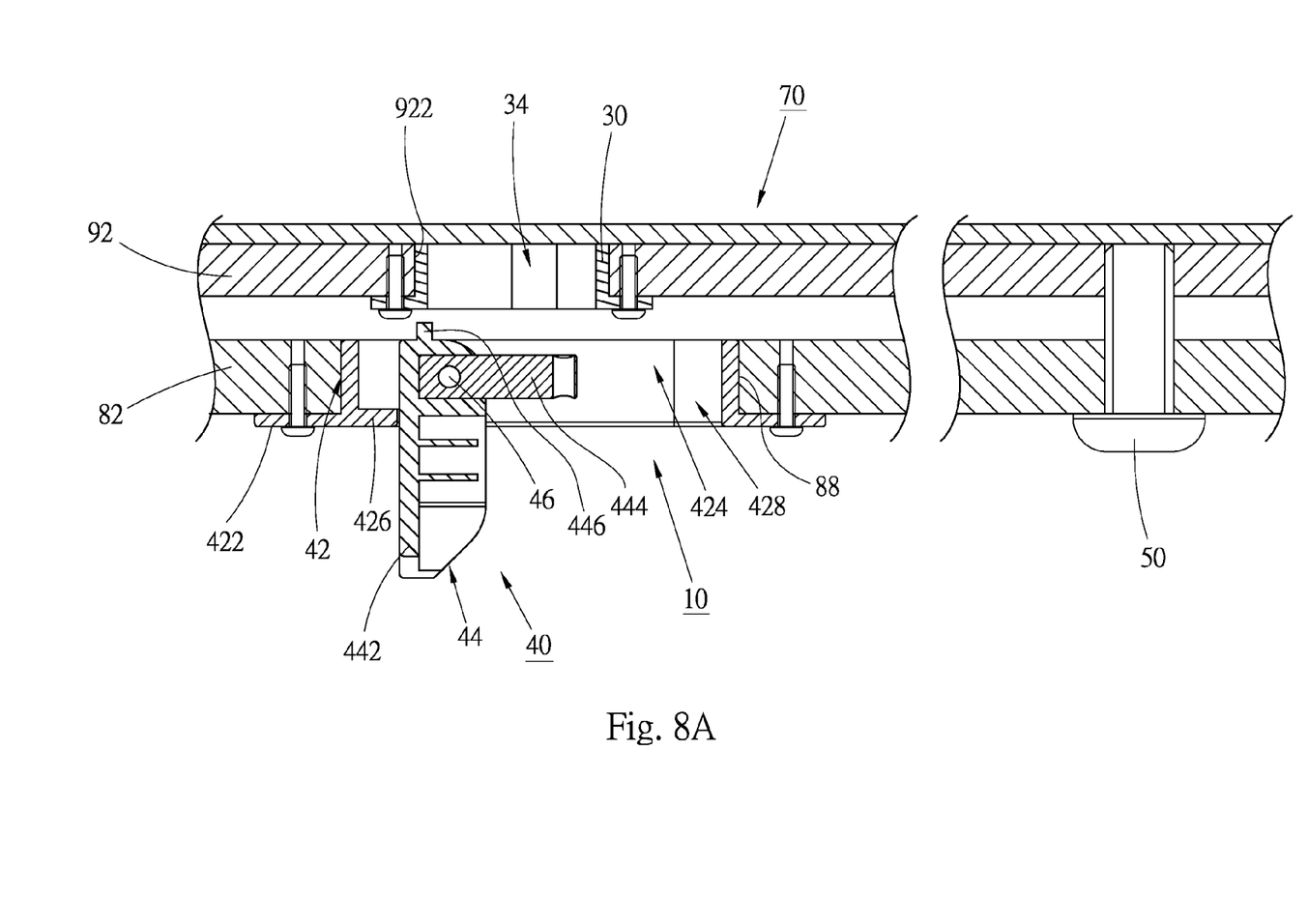
FIG. 8A is a sectional view, in which the latch component is in the released position in order to unlock the tablet to the framework, in correspondence with FIG. 8.
Figure 9:
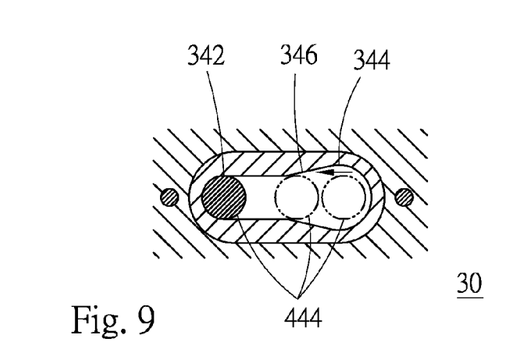
FIG. 9 is a sectional view along a sectional line 9-9 according to FIG. 8.

In addition, referring FIG. 3 again, the switch 44 has a retainer 446 extending outwardly from the connecting end 4421 of the manipulation member 442, the base 42 has a limit portion 426 disposed at an inner face thereof and relative to the retainer 446 of the switch 40 for interference with each other, shown as FIGS. 6, 8A and 9, so that the stop point of the angular displacement of the switch 40 is also defined when the retainer 446 of the switch 40 abuts against the limit portion 426 of the base 42.

With respect to FIGS. 6, 7 and 8A at the same time, the switch 44 is pulled for releasing the latch status and unlocking the tablet 90 from the framework 80. At the moment, the manipulation member 442 of the switch 44 is pulled out angularly to leave the trough passage 424 of the base 42; the shut member 444 of the switch 44 moves in angular manner as well to leave the channel 34 of the confinement component 30, and is further received in the through passage 424 of the base 42, the switch 40 is located in the released position.

The latch mechanism 10 according to the present invention locks the tablet 90 to the framework 80 by using the shut member 44 of the latch component 40, arranged on the framework 80, moving angularly and reaching into the channel 34, formed on the tablet 90. To unlock the tablet 90, a reverse step is required. The latch mechanism 10 according to the present invention also benefits from the wider second section 344 of the channel 34 allowing the shut member 444 of the latch component 40 to easily reach inside. In conclusion, the tablet is going to lock with the framework even if the confinement component and the latch component do not align with each other with precision in advance. Consequently, it also brings a fast latch connection between the tablet and the framework. Additionally, the switch will be hidden in the base while in the latched position to keep the users' safe and to keep a tidy appearance for the whole game table.

Figure 4:
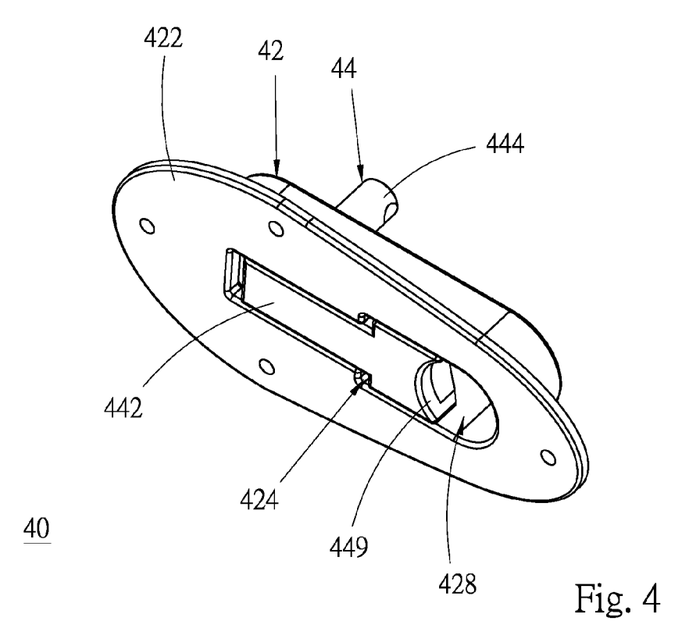
FIG. 4 is a perspective view according to the preferred embodiment of the latch mechanism, in which a latch component is in a latched position locking a tablet to a framework.

For further easy operation, a length of the manipulation member 442 of the switch 44 is shorter than that of the through passage 424 of the base 42, shown in FIGS. 4 and 5. A surplus space 428, between a free end of the manipulation member 442 and an inner face of the base 42, is defined in the through passage 424 to accommodate a user's finger to be inserted, while the manipulation member 442 angularly moves inside the through passage 424 of the base 42. Referring to FIGS. 3, 6 and 7, the manipulation member 442 of the switch 44 defines a recess 448 behind the free end thereof for the user's finger. That allows user's finger to clip the manipulation member 442 of the switch 44 to pull outwardly. Furthermore, the free end of the manipulation member 442 defines a terminal face 449 being curved, which allows user's finger to abut against.

Figure 11:
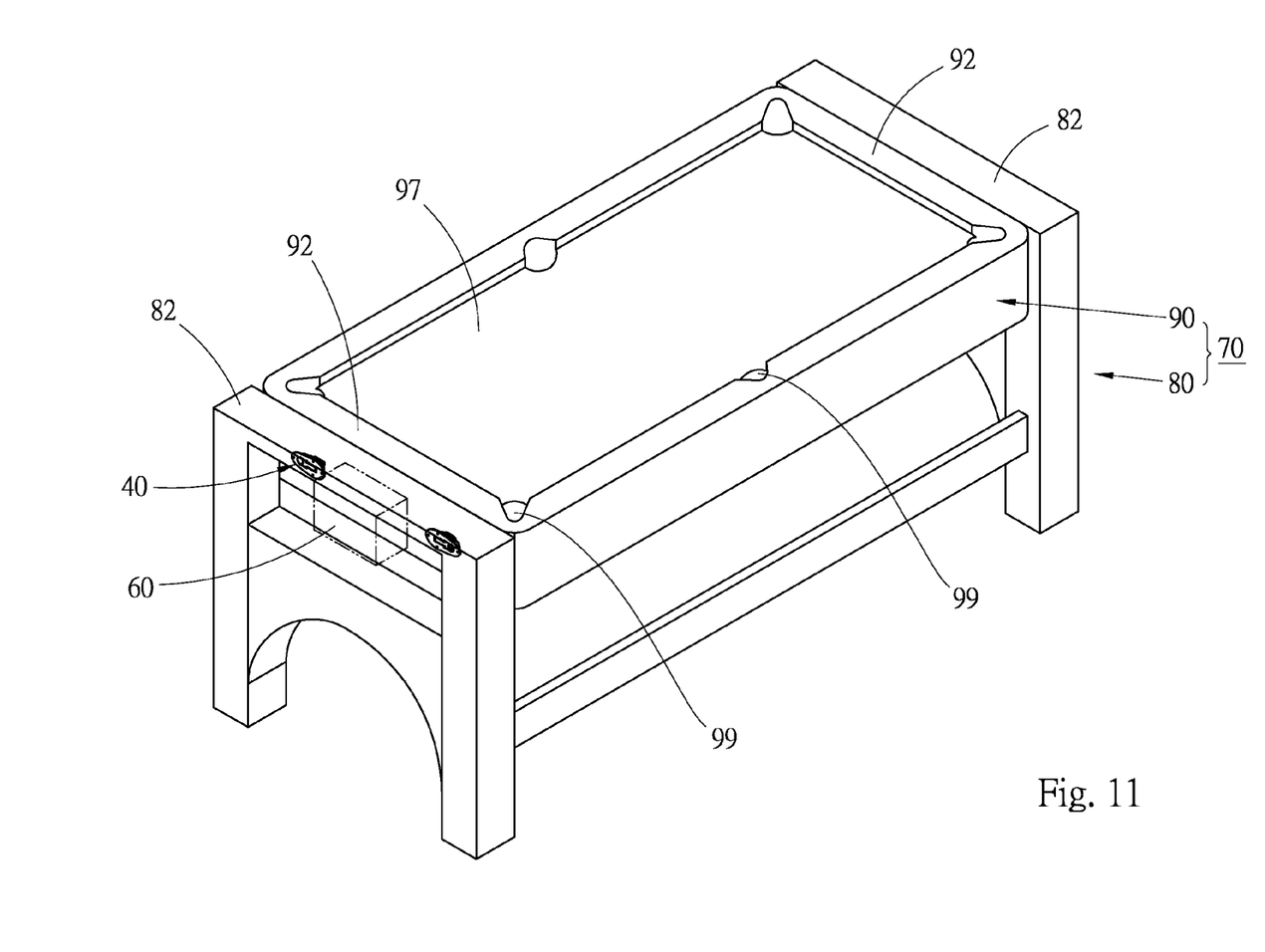
FIG. 11 is a perspective view of the first implementation of the present invention, in which another game mode of the table is located on a top of the tablet after the tablet is flipped.

In use, to turn over the tablet 90 to convert it to another game mode (such as the snooker mode 97), shown in FIG. 11, the manipulation member 442 of the switch 44 is first pulled angularly outwards to release the lock connection between the tablet 90 and the framework 80. Then, the tablet 90 is turned over by rotating 180 degrees, to position the snooker mode 97 face up, illustrated in FIG. 11. After that, the manipulation member 442 of the switch 44 is pressed angularly inwards; the shut member 444 is inserted into the channel 34 so that the tablet 90 is secured to the framework 80. For altering between the locked position and the released position between the tablet 90 and the framework 80, the user only uses the finger to move the switch 44.

The plurality of latch components 40 arranged at each first sides 82 of the framework 80 could be symmetrical to each other, which means the directions of angular movement of the latch components 40 are opposite to each other and the arrangement of channels 34 having the relation with respect to the same axis.

Figure 12:
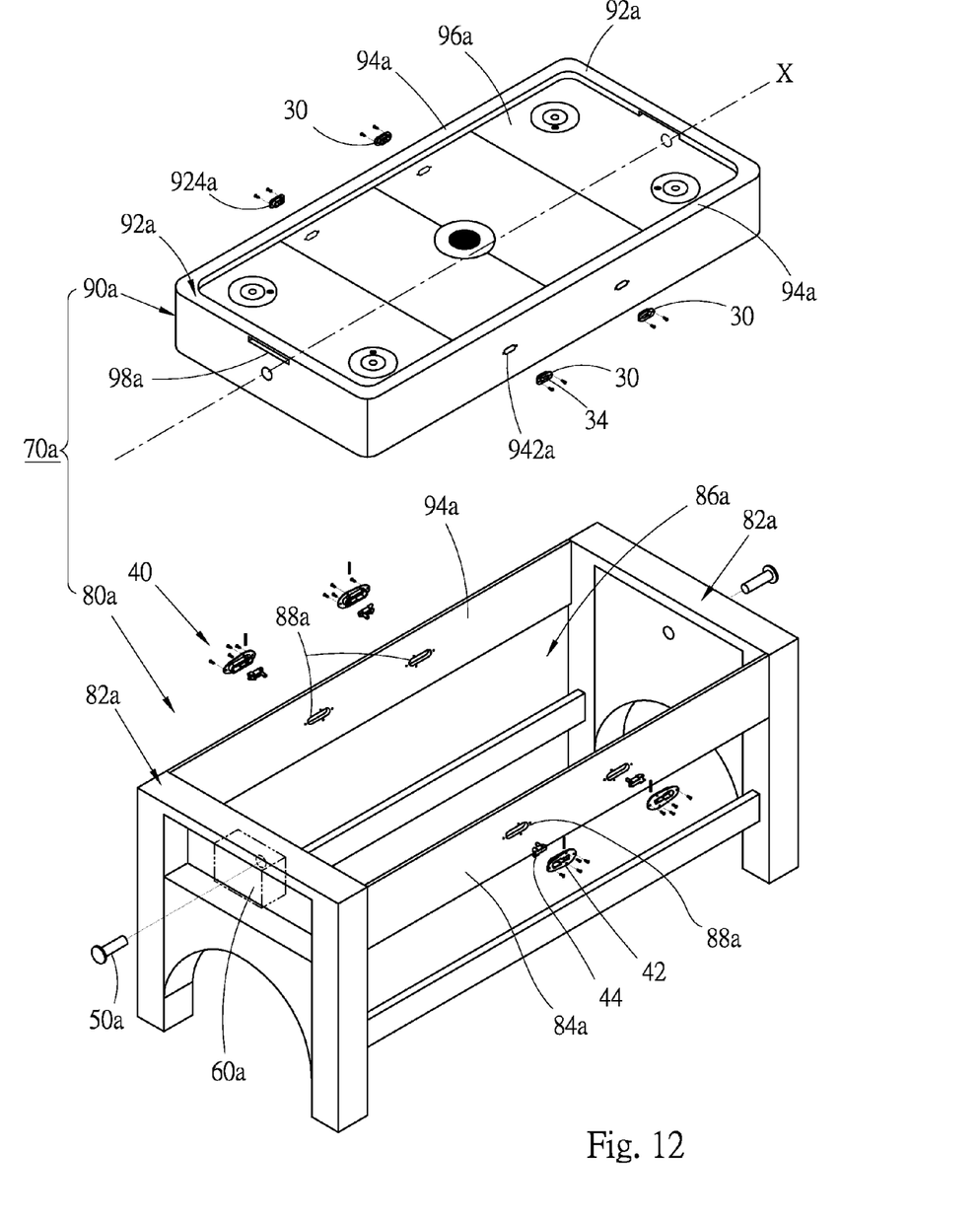
FIG. 12 is a perspective view partially exploded and illustrating a second implementation of the latch mechanism applied for another multi-function game table according to the present invention.

Referring to FIG. 12, a second implementation of the latch mechanism 10 according to the present invention is illustrated. The differences between a game table 70a of the second implantation and the first one are: a framework 80a has a top section being a rectangular frame which includes two opposite first sides 82a, two opposite second sides 84a, and a compartment 86a being defined by the first sides 82a and the second sides 84a together. The framework 80a further includes a plurality of predetermined holes 88a penetrating though each second side 84a to communicate with the compartment 86a, which is used for the tablet 90a turning over therein. The latch components 40 are embedded into the predetermined holes 88a. Two opposite first sides 92a of the tablet 90a are respectively rotatable along an axis located between the two first sides 82a, so that the tablet 90a is supported by the framework 80a and rotatable in the compartment 86a. An exterior face at each second side 94a of the tablet 90 is formed with a plurality of recesses 942a. The confinement component 30 of the latch mechanism 10 is embedded in a respective one of the recesses 942a of the tablet 90a. The main difference in this implantation is the latch mechanisms 10 are arranged at left-and-right lateral sides of the table 70a.

For flipping the tablet 90a to a different game mode, the latch connection between the latch component 40 and the confinement component 30 is used to adjust the orientation and to secure the tablet 90a to the framework 80a.

The above embodiments are only used to illustrate the present invention, not intended to limit the scope thereof. Many modifications of the above embodiments can be made without departing from the spirit of the present invention.

What is claimed is:

1. A latch mechanism for a multi-function game table having a framework and a table rotatably connected to the framework for flipping the tablet; the latch mechanism comprising:
   a confinement component connected to the tablet of the game table and having a channel formed thereof;
   a latch component connected to the framework of the game table and corresponding to the confinement component, the latch component having a base and a switch;
   wherein the base has a through passage corresponding with the channel of the confinement component;
   wherein the switch is located in the through passage of the base, the switch has a manipulation member and a shut member; the manipulation member is pivotally connected to the base via a connecting end thereof for angular displacement; the shut member is connected to and extends outwardly from the manipulation member, the shut member and the manipulation member move together;
   wherein, when a free end of the manipulation member is pivoted into the through passage of the base, the shut member is inserted into the channel of the confinement component moving the latch component into a latched position fixing the tablet relative to the framework;
   wherein, when the free end of the manipulation member is pivoted out of the through passage of the base, the shut member is withdrawn from the channel of the confinement component moving the latch component into a released position allowing the tablet to rotate relative to the framework.

2. The latch mechanism as claimed in claim 1, wherein the channel of the confinement component has a first section and a second section, an internal diameter of the first section is smaller than an internal diameter of the second section, the channel is wide at a first end and narrow at a second end; when the shut member of the switch is inserted into the channel of the confinement component, the first section of the channel of the confinement component where the shut member is located in the latched position is defined as a stop point of the angular displacement of the switch.

3. The latch mechanism as claimed in claim 2, wherein the internal diameter of the first section is not less than an external diameter of the shut member.

4. The latch mechanism as claimed in claim 2, wherein the confinement component has a guide section located in the channel and connecting the first section and the second section, an internal diameter of the guide section becomes small moving from the second section to the first section.

5. The latch mechanism as claimed in claim 1, wherein the switch has a retainer extending outwardly from the connecting end of the manipulation member, the base has a limit portion located on an inner face thereof, the retainer of the switch and the limit portion of the base limiting a movement of the switch, a stop point of the angular displacement of the switch is defined when the retainer of the switch abuts against the limit portion of the base.

6. The latch mechanism as claimed in claim 2, wherein the switch has a retainer extending outwardly from the connecting end of the manipulation member, the base has a limit portion located on an inner face thereof, the retainer of the switch and the limit portion of the base limiting a movement of the switch, a stop point of the angular displacement of the switch is defined when the retainer of the switch abuts against the limit portion of the base.

7. The latch mechanism as claimed in claim 3, wherein the switch has a retainer extending outwardly from the connecting end of the manipulation member, the base has a limit portion located on an inner face thereof, the retainer of the switch and the limit portion of the base limiting a movement of the switch, a stop point of the angular displacement of the switch is defined when the retainer of the switch abuts against the limit portion of the base.

8. The latch mechanism as claimed in claim 4, wherein the switch has a retainer extending outwardly from the connecting end of the manipulation member, the base has a limit portion located on an inner face thereof, the retainer of the switch and the limit portion of the base limiting a movement of the switch, a stop point of the angular displacement of the switch is defined when the retainer of the switch abuts against the limit portion of the base.

9. The latch mechanism as claimed in claim 2, wherein the latch component has a cover plate extending from a peripheral of an outer face of the base.

10. The latch mechanism as claimed in claim 5, wherein the latch component has a cover plate extending from a peripheral of an outer face of the base.

11. The latch mechanism as claimed in claim 1, wherein a length of the manipulation member of the switch is shorter than a length of the through passage of the base; in the latched position the free end of the manipulation member is spaced apart from an inner face of the base providing a space for finger operation, when the manipulation member angularly moves inside the through passage of the base.

12. The latch mechanism as claimed in claim 2, wherein a length of the manipulation member of the switch is shorter than a length of the through passage of the base; in the latched position the free end of the manipulation member is spaced apart from an inner face of the base providing a space for finger operation, when the manipulation member angularly moves inside the through passage of the base.

13. The latch mechanism as claimed in claim 5, wherein a length of the manipulation member of the switch is shorter than a length of the through passage of the base; in the latched position the free end of the manipulation member is spaced apart from an inner face of the base providing a space for finger operation, when the manipulation member angularly moves inside the through passage of the base.

14. The latch mechanism as claimed in claim 9, wherein a length of the manipulation member of the switch is shorter than a length of the through passage of the base; in the latched position the free end of the manipulation member is spaced apart from an inner face of the base providing a space for finger operation, when the manipulation member angularly moves inside the through passage of the base.

15. The latch mechanism as claimed in claim 1, wherein the manipulation member of the switch has a recess located behind the free end thereof for finger operation.

16. The latch mechanism as claimed in claim 15, wherein the free end of the manipulation member has a terminal face being curved.

17. The latch mechanism as claimed in claim 2, wherein the manipulation member of the switch has a recess located behind the free end thereof for finger operation.

18. The latch mechanism as claimed in claim 5, wherein the manipulation member of the switch has a recess located behind the free end thereof for finger operation.

19. The latch mechanism as claimed in claim 9, wherein the manipulation member of the switch has a recess located behind the free end thereof for finger operation.

20. The latch mechanism as claimed in claim 11, wherein the manipulation member of the switch has a recess located behind the free end thereof for finger operation.

* * * * *